Dec. 8, 1936.   H. LEBEN   2,063,447
ELECTRIC RELAY
Filed Jan. 2, 1934   3 Sheets-Sheet 2
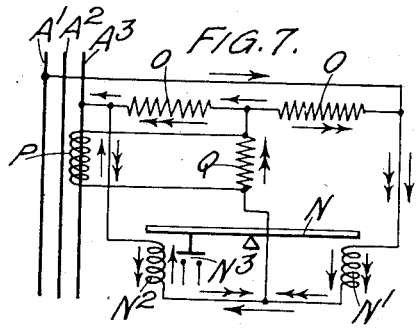
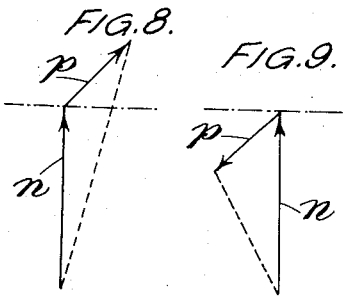
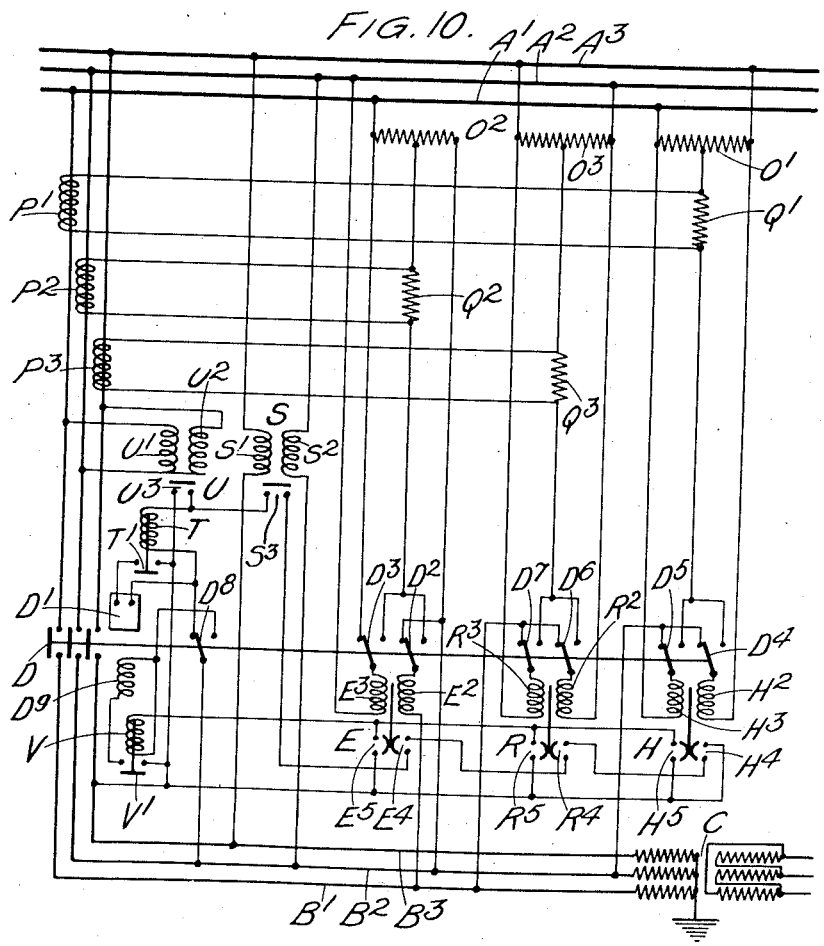
Inventor,
Henry Leben

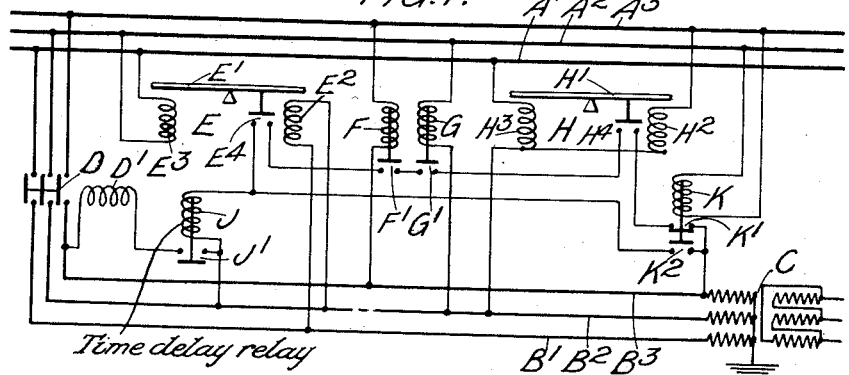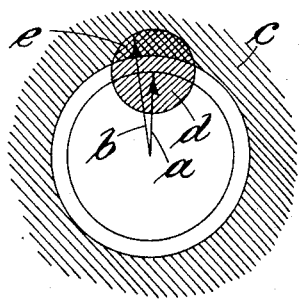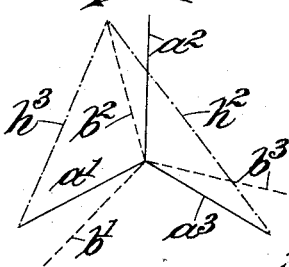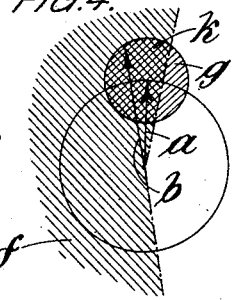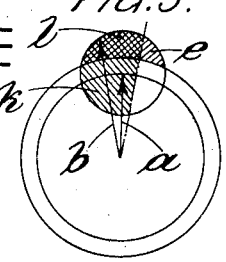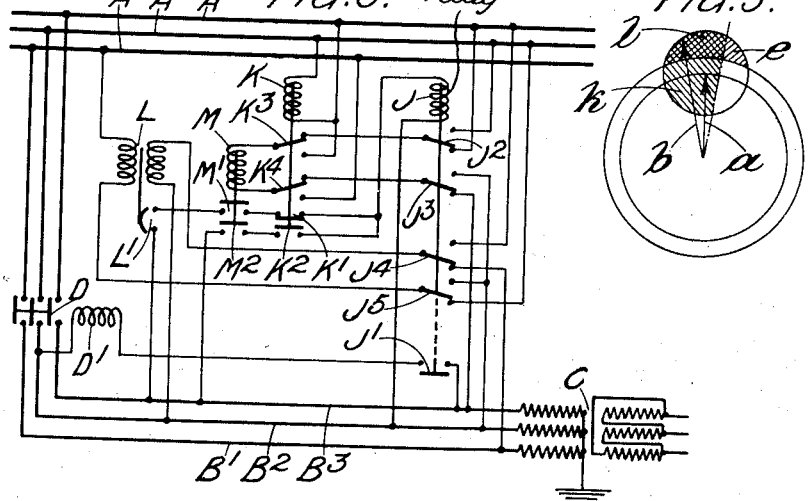

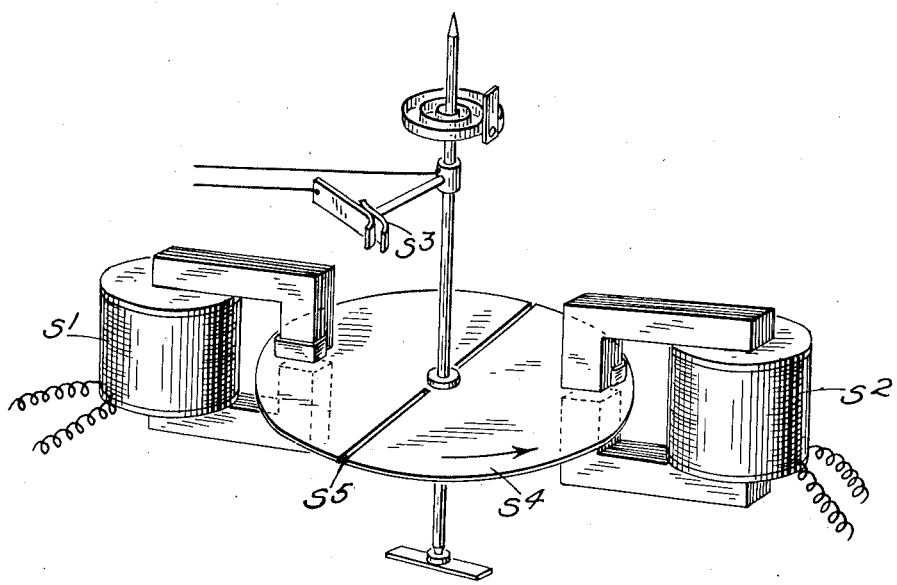

Patented Dec. 8, 1936

2,063,447

UNITED STATES PATENT OFFICE 2,063,447

ELECTRIC RELAY

Henry Leben, Newcastle-upon-Tyne, England, assignor to A. Reyrolle & Company Limited, Hebburn-upon-Tyne, England, a registered company of Great Britain Application January 2, 1934, Serial No. 704,978
In Great Britain January 13, 1933

18 Claims. (Cl. 175—294)

This invention relates to electric relays and, although not limited thereto has more particular reference to a relay for use in controlling the closing of a circuit-breaker between two three-phase systems.

Thus for instance in a distribution network supplied through a group of feeders with or without power transformers in the feeders, it is desirable to be able to close automatically the circuit-breaker, through which each feeder is connected to the network, when the conditions indicate that a demand exists on the network. For this purpose a device, which may conveniently be termed a "load synchronizer", may be employed, which will close the circuit-breaker when synchronism exists between the feeder and the network and the conditions are such that power will flow in the forward direction (i. e. from the feeder to the network) when the circuit-breaker closes. Such a device may be employed in conjunction with a protective arrangement for opening the circuit-breaker in the event of a reversal of power flow, and it has been proposed to provide a special form of relay device known as a "network protector" for performing the dual functions of such a protective arrangement and a load synchronizer.

The present invention has for its object to provide an improved load synchronizer arrangement and an improved practical construction and arrangement of relay more especially intended for use in conjunction with other relays to constitute such load synchronizer.

The electric relay according to the invention comprises a contact member differentially controlled by two coils respectively energized in accordance with two voltages whose magnitudes are dependent on the phase relationship between the voltages of two three-phase systems. Preferably one coil is energized in accordance with the voltage between a phase of the first system and the phase lagging behind the corresponding phase of the second system, whilst the other coil is energized in accordance with the voltage between a phase of the first system and the phase leading the corresponding phase of the second system.

Such a relay may be utilized for controlling the closing of a circuit-breaker between the two three-phase systems by using one coil as an operating coil and the other as a restraining coil. Thus the relay may constitute what may be termed a "leading phase relay" in a load synchronizer arrangement, and in this case the operating coil may be energized in accordance with the voltage between a phase of the supply circuit and the phase lagging behind the corresponding phase of the network, whilst the restraining coil is energized in accordance with the voltage between a phase of the supply circuit and the phase leading the corresponding phase of the network.

In a complete load synchronizer arrangement this leading phase relay is employed in association with other relays, but the arrangement of the associated relays may vary. Thus in one arrangement the leading phase relay is employed in conjunction with two synchronizing relays of the undervoltage type, each energized in accordance with the voltage between corresponding phases of the two systems, and a second differential relay operative when the supply circuit voltage is greater than the network voltage, the four relays together controlling the closing of the circuit-breaker. A time delay is preferably introduced in the operation of closing the circuit-breaker either in the circuit-breaker closing mechanism or by means of a separate time-lag relay. The four relays may be reduced to three by replacing the two synchronizing undervoltage relays by a single relay of the induction disc type, wherein the disc is acted on by the mechanical sum of two torques each dependent on the voltage between a phase of one system and the corresponding phase of the other system. Alternatively the four relays may be reduced to two by combining together the two differential relays and also the two synchronizing relays, the coils of these composite relays being first connected up for the performance of one function and then transferred by a time-lag relay after a predetermined time to the connections for the performance of the other function, the circuit-breaker being closed by the time-lag relay after a further predetermined time.

The load synchronizer may be employed in conjunction with a protective arrangement for opening the circuit-breaker on reversal of power flow, and in this case the opening of the circuit-breaker may be controlled by reverse-power relays, the movable member of each relay being subjected to the opposed action of two forces, one of which is dependent on the sum of two quantities derived respectively from the voltage and from the current in the appropriate phase or phases, whilst the other is dependent on the difference of the same two quantities.

The invention may be carried into practice in various ways, but some convenient alternative arrangements according thereto are illustrated by way of example in the accompanying drawings, in which Figure 1 is a circuit diagram of a simple load synchronizer arrangement incorporating the features of the invention, Figures 2–5 are vector diagrams illustrating the operation of the arrangement of Figure 1, Figure 6 is a circuit diagram of a modified load synchronizer arrangement, Figure 7 illustrates the arrangement of a reverse power relay forming part of a protective arrangement for use with the load synchronizer arrangement of Figure 1, Figures 8 and 9 are vector diagrams for the reverse power relay of Figure 7, Figure 10 is a circuit diagram of a preferred combined load synchronizer and protective arrangement, and Figure 11 shows a convenient practical construction for one of the relays employed in the arrangement of Figure 10.

These arrangements will be described with reference to the control of a three-phase distribution network $A^1 A^2 A^3$ fed from a high voltage three-phase transmission system through a group of feeders $B^1 B^2 B^3$ each including a power transformer C. Each feeder $B^1 B^2 B^3$ is connected to the network through a circuit-breaker D, the closing of which is automatically controlled by a load synchronizer arrangement. Whilst the power transformer C may be at the remote end of the feeder, it will usually be located close to the circuit-breaker D, the various relays in either case being energized from the part of the feeder $B^1 B^2 B^3$ between the transformer C and the circuit-breaker. Suitable protective gear is provided to isolate the feeder $B^1 B^2 B^3$ from the network in the event of a fault on the feeder or its power transformer C. Such protective gear may be for instance of the Merz-Price type or may employ reverse power relays arranged in the manner described below with reference to Figures 7–10.

The load synchronizer itself is concerned with the automatic reclosing of the circuit-breaker D, when supply is to be resumed through the feeder $B^1 B^2 B^3$. For this purpose it is necessary to ensure that the voltages on the two sides of the circuit-breaker are in synchronism with one another and that the direction of power flow when the circuit-breaker closes will be in the forward direction from the feeder $B^1 B^2 B^3$ to the network $A^1 A^2 A^3$, the latter condition being necessary in order to prevent pumping from occurring as the result of the immediate reopening of the circuit-breaker by the protective gear. These conditions are fulfilled in the arrangement of Figure 1 by means of four relays, namely a "balanced voltage relay" E which ensures that the feeder voltage exceeds the network voltage, two synchronizing relays F G for ensuring that the two voltages are in synchronism and do not differ by more than a small amount and that the phases are not crossed, and a leading phase relay H which ensures that the feeder voltage leads the network voltage or lags by a very small amount behind such voltage. In practice it is sometimes found desirable to employ two leading phase relays instead of one, particularly on networks where highly unbalanced loads may be expected.

The balanced voltage relay E, which may be for instance of the pivoted beam type (as shown) or of the induction disc type, consists of a contact member $E^1$ differentially acted on by an operating coil $E^2$ and a restraining coil $E^3$. The operating coil $E^2$ is connected between two of the phases $B^1 B^2$ of the feeder and the restraining coil $E^3$ is similarly connected between the corresponding two phases $A^1 A^2$ of the network. Thus this relay will close its contacts $E^4$ when the feeder voltage exceeds the network voltage.

The synchronizing relay F consists of a simple electromagnetic or induction disc relay of the undervoltage type and is connnected between one of the phases $A^3$ of the network and the corresponding phase $B^3$ of the feeder, the arrangement being such that the relay closes its contacts $F^1$ when the voltage between these two phases falls below a predetermined value, i. e. when the two voltages are approximately in phase and differ by a small amount only.

The diagram of Figure 2 illustrates the operation of the relays E and F. Thus the vector $a$ represents the network voltage and the vector $b$ the feeder voltage. The balanced voltage relay E will only close its contacts $E^4$ when the feeder voltage is greater than the network voltage, i. e. when the end of the feeder voltage vector $b$ lies in the shaded area marked $c$ outside a circle having a slightly greater radius than the length of the network voltage vector $a$. The synchronizing relay F will only close its contacts $F^1$ when the end of the feeder voltage vector $b$ lies within the shaded area $d$ consisting of a small circle with the end of the vector $a$ as centre. Thus the cross-hatched crescent-shaped area $e$ includes the possible positions of the end of the vector $b$ in relation to the vector $a$ when both contacts $E^4$ and $F^1$ are closed.

The second synchronizing relay G is similar to the first synchronizing relay F but is connected in a different phase, namely between the network phase $A^2$ and the feeder phase $E^2$. Two synchronizing relays are employed in order to ensure that the phases shall not be crossed when the circuit-breaker closes.

The leading phase relay H is arranged according to the present invention and is similar in construction to the balanced voltage relay E, but the connections of the coils are different. Thus the relay consists of a contact member $H^1$ differentially acted on by an operating coil $H^2$ and a restraining coil $H^3$ and controlling contacts $H^4$. The operating coil $H^2$ is connected between a phase of the feeder, say $B^2$, and the phase which lags behind the corresponding network phase, namely $A^3$, whilst the restraining coil $H^3$ is connected between a phase of the feeder, say $B^2$, and the phase which leads the corresponding network phase, namely $A^1$. Figure 3 shows a vector diagram in which the vectors $a^1 a^2 a^3 b^1 b^2 b^3$ respectively represent the voltages on the phases $A^1 A^2 A^3 B^1 B^2 B^3$, and it will be at once clear from this diagram that the magnitudes of the energizing voltages $h^2 h^3$ of the two coils $H^2 H^3$ vary in accordance with the vector positions of the two systems, and (if the relay is symmetrically arranged) the operating voltage $h^2$ will be greater than the restraining voltage $h^3$ whenever the feeder vector system leads the network vector system. This will be true irrespective of the relative magnitudes of the feeder and network voltages, provided that the three voltage vectors of each system are substantially equal to one another. In practice it is preferable to arrange the relay somewhat asymmetrically, so that the relay will close its contacts $H^4$ when the feeder voltage leads the network voltage by an angle not greater than a few degrees more than 180° or when the feeder voltage lags behind the network voltage by a few degrees. This is indicated in the diagram of Figure 4, wherein the shaded area $f$ represents the possible positions of the end of the feeder voltage vector $b$ relative to the network voltage vector $a$ for closing of the contacts $H^4$. The small shaded circle $g$ gives the possible closing positions for the synchronizing relay G, this circle being identical with the circle $d$ of Figure 2, and the cross-hatched segment $k$ indicates the possible conditions when both contacts $G^1$ $H^4$ are closed.

In practice it is possible that the network voltages may be unbalanced due to loading conditions and it may then be possible for the contacts $H^4$ to close when the feeder voltage lags behind the network voltage by a greater amount than is permissible. This, however, can be taken care of by the provision of a second leading phase relay connected across different phases, so that at least one of the two relays will hold its contacts open when the conditions are unsatisfactory for closing the circuit-breaker D.

The contacts $E^4$ $F^1$ $G^1$ $H^4$ of the four relays are connected in series with one another in the energizing circuit of a definite time limit relay J whose contacts $J^1$ control the energization of the circuit-breaker closing coil $D^1$, or alternatively the definite time limit relay may be omitted, a time-lag being introduced in the operation of the circuit-breaker closing mechanism. Thus the circuit-breaker D will close only when the four relays hold their contacts closed for a predetermined time. The diagram of Figure 5 indicates the resultant of the two cross-hatched areas $e$ $k$ of Figures 2 and 4, so that the area $l$ represents the permissible closing conditions for the circuit-breaker.

It is also desirable to provide means whereby the circuit-breaker can be closed when the network is entirely deenergized. This may be effected by the provision of a further relay K, which may be termed the "dead network relay". This relay K consists of a simple electromagnetic undervoltage relay connected across two of the phases $A^2$ $A^3$ of the network and arranged to operate its contacts when the voltage between these phases falls below a predetermined value. The dead network relay has a normally closed contact $K^1$ in series with the contacts $E^4$ $F^1$ $G^1$ $H^4$ of the other four relays and a normally open contact $K^2$ controlling an alternative energizing circuit for the definite time limit relay J. Thus when the network voltage collapses, this relay K acts to cut the other four relays out of circuit and to control directly the time limit relay J.

Since it is undesirable to rely on the action of a simple undervoltage relay, a second relay may be used as a check, and one of the synchronizing relays F G will adequately serve for this purpose, this relay being provided with further contacts in series with the dead network relay contacts $K^2$, whilst its connections are transferred on operation of the dead network relay to enable it to be used as an auxiliary dead network relay. Such an arrangement is included in the modification to be described later with reference to Figure 6. Alternatively the necessity for a check relay may be avoided by the employment of a double element relay as the dead network relay, its two operating coils being connected across different pairs of phases and acting on a single contact member, so that the failure of one element will not jeopardize the operation of the system. Such a double element relay is included in the preferred arrangement shown in Figure 10.

The above arrangement may be modified in various ways to reduce the number of relays employed. Figure 6 shows one such modification in which a single differential relay L is utilized to perform the functions of the balanced voltage relay E and the leading phase relay H, and similarly a single relay M is used to perform the functions of the two synchronizing relays F, G, the definite time limit relay J being employed to control the connections of these relays. Thus normally with the circuit-breaker D open, change-over contacts $J^2$ $J^3$ $J^4$ $J^5$ on the definite time limit relay act to connect up the operating coils of the relays L M so that they perform the functions of the balanced voltage relay E and the synchronizing relay F as in the arrangement of Figure 1, the contacts $L^1$ $M^1$ of these relays being connected in series with the contact $K^1$ of the dead network relay K in the energizing circuit of the time limit relay J. Thus if with these connections the contacts $L^1$ $M^1$ remain closed for a predetermined time, say ten seconds, the time limit relay J will operate its contacts $J^2$ $J^3$ $J^4$ $J^5$ to transfer the connections of the relays L M to perform the functions of the leading phase relay H and the second synchronizing relay G. The circuit-breaker D will be closed by the operation of the time limit relay contact $J^1$ after a further ten-second time interval, provided that the contacts $L^1$ $M^1$ still remain closed with the new relay connections. The dead network relay K is arranged as in Figure 1 except for the provision of further change-over contacts $K^3$ $K^4$ which control the connections of the composite synchronizing relay M to enable this relay to be used as a check for the dead network relay in the manner above referred to, further contacts $M^2$ being provided on this relay in series with the dead network relay contacts $K^2$.

In another modified arrangement the leading phase relay H, the balanced voltage relay E and the dead network relay K are arranged as before, but the two synchronizing relays F G are replaced by a single synchronizing relay of the induction disc type, as shown in Figure 11. In this relay the disc $S^4$ is divided into two halves by a slot $S^5$, each half being acted upon by a coil $S^1$ or $S^2$ connected between a phase of the feeder and the corresponding phase of the network. Thus the total torque exerted on the disc is equal to the mechanical sum of the two separate torques due to the two coils, and the disc will consequently move to open the contacts $S^3$ only when the voltages are in synchronism and the phases are not crossed. This synchronizing relay may be employed as a check relay for the dead network relay in the manner above described. Such a combined synchronizing relay is employed in the preferred arrangement to be described later with reference to Figure 10.

Whilst other forms of protective gear may be employed for controlling the opening of the circuit-breaker D in the event of a fault on the feeder $B^1$ $B^2$ $B^3$ or the power transformer C, it is preferred to employ for this purpose a group of three reverse power relays arranged in the manner shown in Figure 7. Each reverse power relay has two operating coils $N^1$ $N^2$ exerting opposed forces on the movable contact member N, which may be in the form of a balanced beam (as shown) or an induction disc or its equivalent. The two coils $N^1$ $N^2$ are connected in series across the same interphase voltage, say $A^1$ $A^3$, with a limiting resistance O across the pair of coils, as indicated by the single-headed arrows. A current transformer P in the phase $A^3$ associated with the voltage $A^1$ $A^3$ has its secondary connected across a resistance Q which is connected on one side between the mid-point of the resistance O and on the other side between the two relay coils $N^1$ $N^2$, i. e. between equipotential points of the main energizing circuit of the relay. The double-headed arrows indicate the flow of the additional current injected into the circuit by the current transformer P. It will be noticed that the current flowing through one coil $N^1$ is made up (as shown in Figure 8) of the vectorial sum of two quantities $n$ $p$ dependent respectively on the main energizing voltage and on the additional energizing current, whilst the current flowing through the other coil $N^2$ is made up (as shown in Figure 9) of the vectorial difference between the same two quantities $n$ $p$. Thus normally the force exerted by the coil $N^1$ will overcome that exerted by the coil $N^2$ and will act to hold the contacts $N^3$ open, whilst on reversal of power flow due to a fault the force due to the coil $N^2$ will become the greater and will cause the contacts $N^3$ to close. It will be realized that the injection of the current vector in opposite senses into the voltage energizing circuits of the two coils may be effected in other ways, for example by connecting the coils each in series with a resistance in parallel to the same interphase voltage with appropriate cross connections from the resistance energized from the current transformer.

The use of reverse power relays of this kind, apart from its other advantages, is especially convenient owing to the fact that it is possible to utilize the leading phase relay and the balanced voltage relay to constitute two of the reverse power relays by providing suitable auxiliary switches on the circuit-breaker to transfer the connections, and this enables considerable economy to be effected in the complete protective and load synchronizing arrangement. The third reverse power relay is also available for use as a leading phase relay in cases where it is found desirable to employ two such relays.

Figure 10 illustrates a preferred complete protective and load synchronizing arrangement, the circuits being shown in condition for load-synchronizing with the circuit-breaker D open. The balanced voltage relay E is arranged as in Figure 1 with the exception that additional contacts $E^5$ operated on reverse movement of the contact member are provided to enable the relay to act as a reverse power relay in the manner described with reference to Figure 7. The circuits to the coils $E^2$ $E^3$ of this relay are controlled by change-over auxiliary switches $D^2$ $D^3$ on the circuit-breaker D, so that with the circuit-breaker open as shown the circuits correspond to those of Figure 1, whilst with the circuit-breaker closed the coils are connected to the limiting resistance $O^2$ and the resistance $Q^2$ energized from the current transformer $P^2$ to enable the relay to act as a reverse power relay.

The leading phase relay H is also arranged as in Figure 1 with additional contacts $H^5$ for reverse power operation, the circuits of the coils $H^2$ $H^3$ being controlled by circuit-breaker auxiliary switches $D^4$ $D^5$ to transfer the connections to the resistances $O^1$ $Q^1$ and the current transformer $P^1$.

A second leading phase relay R exactly similar to the relay H has its coils $R^2$ $R^3$ controlled by circuit-breaker auxiliary switches $D^6$, $D^7$, which in the position shown enable it to act as a leading phase relay with phase connections different from those of the relay H to control the closing contacts $R^4$, whilst in the closed position of the circuit-breaker the coils $R^2$ $R^3$ are connected to the resistances $O^3$ $Q^3$ and the current transformer $P^3$ to enable the relay to act as the third reverse power relay controlling the tripping contacts $R^5$. The three relays H E R when acting as reverse power relays are connected in cyclical order to the different phases to form a complete reverse power relay group.

The two synchronizing relays F G of Figure 1 are in this instance, as above mentioned, replaced by one double-element relay S of the kind shown in Figure 11 whose two coils $S^1$ $S^2$ are connected up as for the separate relays F and G of Figure 1, whilst the single contact $S^3$ is in series with the closing contacts $E^4$ $R^4$ $H^4$ of the relays E H R in the energizing circuit of a closing contactor T whose contacts $T^1$ control the energizing circuit of the circuit-breaker closing coil or motor $D^1$, the contactor circuit being also controlled by an auxiliary change-over switch $D^8$ on the circuit-breaker D.

The dead-network relay K of Figure 1 is also replaced by a double-element relay U whose coils $U^1$ $U^2$ are respectively connected across the network phase pairs $A^1$ $A^2$ and $A^2$ $A^3$, whilst the single contact $U^3$ controls an alternative energizing circuit for the closing contactor T.

The tripping contacts $E^5$ $R^5$ $H^5$ of the three relays E H R operating as reverse power relays are connected in parallel to control a tripping contactor V, which is also controlled by the circuit-breaker auxiliary switch $D^8$ and whose contacts $V^1$ control the circuit-breaker trip coil $D^9$.

It will be appreciated that the above arrangements have been described by way of example only and may be modified in various ways. Moreover, although more especially intended for use in a load synchronizer arrangement, the leading phase relay may also be employed for other purposes within the scope of the invention.

What I claim as my invention and desire to secure by Letters Patent is:—

1. The combination with two associated three-phase electric systems, of means for predetermining the phase relationship between corresponding voltages of the two systems comprising a mechanically balanced relay having a contact member and two coils acting differentially on the contact member, and means for energizing the two coils respectively in accordance with two voltages one of which increases while the other decreases when the phase relationship between corresponding voltages of the two systems changes.

2. The combination with two associated three-phase electric systems, of means for predetermining the phase relationship between corresponding voltages of the two systems comprising a mechanically balanced relay having a contact member and two coils acting differentially on the contact member, means for energizing one of the coils in accordance with the voltage between a phase of the first system and the phase lagging behind the corresponding phase of the second system, and means for energizing the other coil in accordance with the voltage between a phase of the first system and the phase leading the corresponding phase of the second system.

3. Apparatus for controlling the closing of a circuit-breaker between two three-phase systems, comprising a mechanically balanced relay having differentially arranged operating and restraining coils, and means for energizing the two coils respectively in accordance with two voltages one of which increases while the other decreases when the phase relationship between corresponding voltages of the two systems changes.

4. The combination of a three-phase electric supply circuit, a three-phase distribution network, a circuit-breaker for connecting the network to the supply circuit, and apparatus for controlling the closing of the circuit-breaker comprising a differential relay having operating and restraining coils, means for energizing the operating coil in accordance with the voltage between a phase of the supply circuit and the phase lagging behind the corresponding phase of the network, and means for energizing the restraining coil in accordance with the voltage between a phase of the supply circuit and the phase leading the corresponding phase of the network.

5. The combination of a three-phase electric supply circuit, a three-phase distribution network, a circuit-breaker for connecting the network to the supply circuit, and apparatus for controlling the closing of the circuit-breaker comprising a differential relay having operating and restraining coils, means for energizing the two coils of such relay respectively in accordance with two voltages whose magnitudes are dependent on the phase relationship between the supply circuit voltage and the network voltage, a second differential relay, and means whereby such second relay is rendered operative when the supply circuit voltage is greater than the network voltage.

6. The combination of a three-phase electric supply circuit, a three-phase distribution network, a circuit-breaker for connecting the network to the supply circuit, and apparatus for controlling the closing of the circuit-breaker comprising a differential relay having operating and restraining coils, means for energizing the operating coil in accordance with the voltage between a phase of the supply circuit and the phase lagging behind the corresponding phase of the network, means for energizing the restraining coil in accordance with the voltage between a phase of the supply circuit and the phase leading the corresponding phase of the network, a second differential relay having operating and restraining coils, means for energizing the operating coil of such second relay in accordance with the voltage between two phases of the supply circuit, and means for energizing the restraining coil of the second relay in accordance with the voltage between the corresponding two phases of the network.

7. The combination with the features set forth in claim 5, of means for preventing closure of the circuit-breaker unless the supply circuit and network voltages are approximately in synchronism and the phases are not crossed.

8. The combination with the features set forth in claim 6, of two synchronizing relays of the undervoltage type, means for energizing one synchronizing relay in accordance with the voltage between a phase of the supply circuit and the corresponding phase of the network, means for energizing the other synchronizing relay in accordance with the voltage between another phase of the supply circuit and the corresponding network phase, and means whereby the two synchronizing relays cooperate with the two differential relays in controlling the closure of the circuit-breaker.

9. The combination with the features set forth in claim 6, of a synchronizing relay of the induction disc type having two operating coils, means whereby the disc of the relay is acted on by the mechanical sum of two torques respectively exerted thereon by the two coils, means for energizing one coil in accordance with the voltage between a phase of the supply circuit and the corresponding network phase, means for energizing the other coil in accordance with the voltage between another phase of the supply circuit and the corresponding network phase, and means whereby the synchronizing relay prevents closure of the circuit-breaker unless the sum of the two torques exerted on the disc is less than a predetermined value.

10. The combination of a three-phase electric supply circuit, a three-phase distribution network, a circuit-breaker for connecting the network to the supply circuit, and apparatus for controlling the closing of the circuit-breaker comprising a differential relay having operating and restraining coils, a time-lag relay controlled by the differential relay, means whereby the time-lag relay operates after a predetermined time to transfer the connections of the coils of the differential relay, means whereby the time-lag relay operates after a further predetermined time to cause the circuit-breaker to close, means whereby the operating coil of the differential relay is normally energized in accordance with the voltage between a phase of the supply circuit and the phase lagging behind the corresponding network phase, means whereby the restraining coil of the differential relay is normally energized in accordance with the voltage between a phase of the supply circuit and the phase leading the corresponding network phase, and means whereby after the first operation of the time-lag relay the operating coil of the differential relay is energized in accordance with the voltage between two phases of the supply circuit and the restraining coil is energized in accordance with the voltage between the corresponding two network phases.

11. The combination with the features of claim 10, of a synchronizing relay of the undervoltage type, means whereby the synchronizing relay cooperates with the differential relay to control the time-lag relay, means whereby the synchronizing relay is normally energized in accordance with the voltage between a phase of the supply circuit and the corresponding network phase, and means whereby the time-lag relay after the first predetermined time operates to transfer the connections of the synchronizing relay so that such relay is energized in accordance with the voltage between another phase of the supply circuit and the corresponding network phase.

12. The combination with the features set forth in claim 3, of a protective arrangement controlling the opening of the circuit-breaker between the two three-phase systems comprising at least one reverse power relay having a movable member and two coils exerting opposed forces on the movable member, means for energizing one coil in accordance with the sum of two quantities derived respectively from the voltage and from the current in the systems, and means for energizing the other coil in accordance with the difference between the same two quantities.

13. The combination with the features set forth in claim 6, of a protective arrangement controlling the opening of the circuit-breaker between the two three-phase systems comprising at least one reverse power relay having a movable member and two coils exerting opposed forces on the movable member, means for energizing one coil in accordance with the sum of two quantities derived respectively from the voltage and from the current in the systems, and means for energizing the other coil in accordance with the difference between the same two quantities.

14. The combination with the features set forth in claim 4, of means whereby the circuit-breaker acts on closing to transfer the connections of the differential relay, means whereby when the circuit-breaker is closed one coil of the differential relay is energized in accordance with the sum of two quantities derived respectively from the voltage and from the current in the main circuit and the other coil is energized in accordance with the difference between the same two quantities whereby the relay will act as a reverse power relay, and means whereby the differential relay when acting as a reverse power relay controls the opening of the circuit-breaker.

15. The combination with the features set forth in claim 6, of means whereby the circuit-breaker acts on closing to transfer the connections of the two differential relays to enable them to act as reverse power relays associated with different phases of the main circuit, means whereby when the circuit-breaker is closed one coil of each differential relay is energized in accordance with the sum of two quantities derived respectively from the voltage and from the current in the appropriate phases of the main circuit and the other coil is energized in accordance with the difference between the same two quantities, and means whereby the two relays when so acting as reverse power relays control the opening of the circuit-breaker.

16. The combination of a three-phase electric supply circuit, a three-phase distribution network, a circuit-breaker for connecting the network to the supply circuit, three differential relays each having a contact member and two coils exerting opposed forces on the contact member, means whereby the circuit-breaker on closing transfers the connections of the coils of the three relays and on opening brings such connections back to their original condition, means whereby when the circuit-breaker is open the two coils of one of the relays are respectively energized from corresponding interphase voltages of the supply circuit and of the network so that the relay operates when the supply circuit voltage is greater than the network voltage, means whereby when the circuit-breaker is open the two coils of each of the other two relays are respectively energized in accordance with voltages whose magnitudes are dependent on the phase relationship between the supply circuit voltage and the network voltage, means whereby the three relays cooperate to control the closing of the circuit-breaker, and means whereby when the circuit-breaker is closed the three relays act as reverse power relays associated with different phases and control the opening of the circuit-breaker.

17. The combination with the features of claim 16, of at least one synchronizing relay acting to prevent closure of the circuit-breaker unless the supply circuit voltage and the network voltage are approximately in synchronism without crossed phases.

18. The combination with the features of claim 16, of at least one synchronizing relay acting to prevent closure of the circuit-breaker unless the supply circuit voltage and the network voltage are approximately in synchronism without crossed phases, and a further relay of the undervoltage type energized from the network and acting to control the closing of the circuit-breaker in the event of the network being deenergized.

HENRY LEBEN.